United States Patent
Giladi

(10) Patent No.: US 10,616,297 B2
(45) Date of Patent: Apr. 7, 2020

(54) CONTENT-SPECIFIC IDENTIFICATION AND TIMING BEHAVIOR IN DYNAMIC ADAPTIVE STREAMING OVER HYPERTEXT TRANSFER PROTOCOL

(71) Applicant: Futurewei Technologies, Inc., Plano, TX (US)

(72) Inventor: Alexander Giladi, Princeton, NJ (US)

(73) Assignee: Futurewei Technologies, Inc., Plano, TX (US)

( * ) Notice: Subject to any disclaimer, the term of this patent is extended or adjusted under 35 U.S.C. 154(b) by 458 days.

(21) Appl. No.: 13/937,058

(22) Filed: Jul. 8, 2013

(65) Prior Publication Data

US 2014/0013003 A1 Jan. 9, 2014

Related U.S. Application Data

(60) Provisional application No. 61/669,510, filed on Jul. 9, 2012.

(51) Int. Cl.
*G06F 15/16* (2006.01)
*H04L 29/06* (2006.01)
*H04N 21/254* (2011.01)

(52) U.S. Cl.
CPC ........ *H04L 65/60* (2013.01); *H04L 29/06523* (2013.01); *H04L 65/4084* (2013.01); *H04L 65/604* (2013.01); *H04N 21/2541* (2013.01)

(58) Field of Classification Search
CPC .............. H04L 65/60; H04L 29/06523; H04L 65/4084; H04L 65/604; H04N 21/2541
USPC ........................................................ 709/231
See application file for complete search history.

(56) References Cited

U.S. PATENT DOCUMENTS

2005/0033700 A1 2/2005 Vogler et al.

2007/0291779 A1* 12/2007 Wunderlich ............ H04L 69/16
370/411
(Continued)

FOREIGN PATENT DOCUMENTS

EP 1420583 A2 5/2004
JP 2004180288 A 6/2004
(Continued)

OTHER PUBLICATIONS

Foreign Communication From A Counterpart Application, PCT Application No. PCT/US2013/049644, International Search Report dated Oct. 28, 2013, 5 pages.
(Continued)

*Primary Examiner* — Oscar A Louie
*Assistant Examiner* — Oluwatosin M Gidado
(74) *Attorney, Agent, or Firm* — Conley Rose, P.C.

(57) ABSTRACT

An apparatus comprises a processor configured to create a Dynamic Adaptive Streaming over Hypertext Transfer Protocol (DASH) media presentation description (MPD), wherein the MPD comprises an AssetIdentifier element associated with a period, wherein the AssetIdentifier element specifies that the period belongs to a certain asset, and wherein the asset is content including media and metadata together with the rights to use the content by a content provider, and a transmitter configured to transmit the MPD. An apparatus comprises a receiver configured to receive a Dynamic Adaptive Streaming over Hypertext Transfer Protocol (DASH) media presentation description (MPD), wherein the MPD comprises an AssetIdentifier element associated with a period, wherein the AssetIdentifier element specifies that the period belongs to a certain asset, and wherein the asset is content including media and metadata together with the rights to use the content by a content provider, and a processor configured to process the MPD.

26 Claims, 6 Drawing Sheets

(56) References Cited

U.S. PATENT DOCUMENTS

| | | | |
|---|---|---|---|
| 2009/0163281 A1* | 6/2009 | Wang | H04N 5/85 463/43 |
| 2010/0138037 A1* | 6/2010 | Adelberg | G06Q 10/087 700/241 |
| 2010/0192210 A1 | 7/2010 | Purdy et al. | |
| 2011/0116772 A1* | 5/2011 | Kwon | H04N 21/23439 386/343 |
| 2011/0145430 A1* | 6/2011 | Ha | H04N 21/23439 709/231 |
| 2011/0231520 A1 | 9/2011 | Ha et al. | |
| 2011/0238789 A1* | 9/2011 | Luby | H04N 21/23106 709/219 |
| 2011/0289531 A1 | 11/2011 | Moonka et al. | |
| 2012/0005303 A1* | 1/2012 | Hwang | H04N 21/23614 709/217 |
| 2012/0023253 A1* | 1/2012 | Rhyu | H04L 65/4069 709/231 |
| 2012/0042050 A1 | 2/2012 | Chen et al. | |
| 2012/0042335 A1* | 2/2012 | Hwang | H04N 21/41407 725/32 |
| 2012/0047542 A1 | 2/2012 | Lewis et al. | |
| 2012/0090036 A1 | 4/2012 | Kang et al. | |
| 2013/0031580 A1* | 1/2013 | Keum | G06Q 30/00 725/32 |
| 2013/0060956 A1* | 3/2013 | Nagaraj | H04N 21/4384 709/231 |
| 2013/0091251 A1* | 4/2013 | Walker | H04N 21/6125 709/219 |
| 2013/0124749 A1 | 5/2013 | Thang et al. | |
| 2013/0191511 A1* | 7/2013 | Liu | H04L 67/2847 709/219 |
| 2013/0212231 A1* | 8/2013 | Shi | H04L 65/605 709/219 |
| 2014/0006951 A1* | 1/2014 | Hunter | H04H 60/31 715/719 |
| 2014/0280785 A1 | 9/2014 | Thang et al. | |
| 2017/0041371 A9* | 2/2017 | Thang | H04L 65/608 |

FOREIGN PATENT DOCUMENTS

| | | |
|---|---|---|
| JP | 2007129500 A | 5/2007 |
| JP | 2010504044 A | 2/2010 |
| JP | 2013538506 A | 10/2013 |
| KR | 20110053176 A | 5/2011 |
| KR | 20120034550 A | 4/2012 |
| WO | 2008033944 A2 | 3/2008 |
| WO | 2011108908 A2 | 9/2011 |
| WO | 2012034501 A1 | 3/2012 |
| WO | 2012047028 A2 | 4/2012 |

OTHER PUBLICATIONS

Foreign Communication From A Counterpart Application, PCT Application No. PCT/US2013/049644, Written Opinion dated Oct. 28, 2013, 8 pages.

Hartung, F., et al., "DRM Protected Dynamic Adaptive HTTP Streaming," XP055064987, Feb. 23-25, 2011, pp. 277-282.

"Information Technology—Coding of Audio-Visual Objects—Part 12: ISO Base Media File Format, Technical Corrigendum 5," ISO/IEC JTC 1/SC 29, ISO/IEC 14496-12:2008/Cor.5:2011(E), Dec. 12, 2011, 47 pages.

Foreign Communication From A Counterpart Application, Korean Application No. 10-2015-7000599, Korean Office Action dated Jul. 20, 2015, 5 pages.

Foreign Communication From A Counterpart Application, Korean Application No. 10-2015-7000599, English Translation of Korean Office Action dated Jul. 20, 2015, 4 pages.

Foreign Communication From A Counterpart Application, Korean Application No. 10-2015-7000599, Korean Notice of Allowance dated Mar. 18, 2016, 3 pages.

Partial English Translation and Abstract of Japanese Patent Application No. JPA2004-180288, dated Apr. 6, 2016, 89 pages.

Partial English Translation and Abstract of Japanese Patent Application No. JPA2007129500, dated Apr. 6, 2016, 38 pages.

Partial English Translation and Abstract of Japanese Patent Application No. JPA2010504044, dated Apr. 6, 2016, 60 pages.

Foreign Communication From A Counterpart Application, Japanese Application No. 2015-521707, Japanese Office Action dated Feb. 2, 2016, 6 pages.

Foreign Communication From A Counterpart Application, Japanese Application No. 2015-521707, English Translation of Japanese Office Action dated Feb. 2, 2016, 8 pages.

Stockhammer, T., et al., "Dynamic Adaptive Streaming over HTTP—Standards and Design Principles," MMSys' Feb. 23-25, 2011, 11 pages.

Foreign Communication From A Counterpart Application, Chinese Application No. 2013800361357, Chinese Search Report dated Sep. 26, 2016, 3 pages.

Foreign Communication From A Counterpart Application, Chinese Application No. 201380036135.7, Chinese Office Action dated Oct. 9, 2016, 8 pages.

Machine Translation and Abstract of International Publication No. WO2012034501, dated Mar. 22, 2012, 19 pages.

"Extensible Markup Language (XML) 1.0 (Fifth Edition)," W3C Recommendation Nov. 26, 2008, http://www.23.org.TR/REC-xml/, 37 pages.

"Information Technology-Dynamic Adaptive Streaming Over HTTP (DASH)—Part 1: Media Presentation Description and Segment Formats, Technical Corrigendum 1," ISO/IEC 23009-1:2012/Cor. 1:2013(E); Jun. 1, 2013, 61 pages.

"Information Technology-Dynamic Adaptive Streaming Over HTTP (DASH)—Part 1: Media Presentation Description and Segment Formats," ISO/IEC 23009-1, ISO/IEC 23009-1:2012(E), Apr. 1, 2012, 134 pages.

Schulzrinne, et al., "Real Time Streaming Protocol (RTSP)," RFC 2326, Apr. 1998, 93 pages.

"Digital Program Insertion—Advertising Systems Interfaces—Part 10—Stream Restriction Data Model (SRDM)," Society of Cable Telecommunications Engineers, Engineering Committee Digital Video Subcommittee, SCTE 130-10 2013, 17 pages.

* cited by examiner

CONTENT-SPECIFIC IDENTIFICATION AND TIMING BEHAVIOR IN DYNAMIC ADAPTIVE STREAMING OVER HYPERTEXT TRANSFER PROTOCOL

CROSS-REFERENCE TO RELATED APPLICATIONS

This application claims priority to U.S. Provisional Application No. 61/669,510 filed Jul. 9, 2012 by Alexander Giladi and titled "Content-Specific Identification and Timing Behavior in DASH," which is incorporated in its entirety.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Many television and movie viewers now desire on-demand access to video and other media content. As a first example, a television viewer may desire to watch a television show that he or she missed during the show's regular air time on television. The viewer may download the show on demand over the Internet via a web browser or other application on a notebook computer, tablet computer, desktop computer, mobile telephone, or other device, then view that show in the browser or other application. As a second example, a viewer may download a movie on demand. As a third example, a viewer may participate in a videoconference with other viewers.

Dynamic Adaptive Streaming over Hypertext Transfer Protocol (DASH) is a standard developed to provide such media content and is partially described in International Organization for Standardization (ISO)/International Electrotechnical Commission (IEC) 23009-1, First Edition, 2012 ("23009-1"), which is incorporated in its entirety. In addition, ISO/IEC 23009-1, Technical Corrigendum 1, 2013 is incorporated in its entirety. In DASH, there are two main devices, the Hypertext Transfer Protocol (HTTP) server or servers that provide the content and the DASH client that downloads the content and is associated with the viewer, or user. DASH leaves control with the client, which can request content using the HTTP protocol. DASH is dynamic and adaptive because the client may choose from among multiple forms of content, or data, based on a variety of factors such as network conditions, device capability, and user choice. For example, the HTTP server may inform the client of different download bit rates, the client may choose one of the bit rates, and the client may begin downloading segments of data at the chosen bit rate. If for some reason network conditions deteriorate, then the client may change to a lower bit rate and begin downloading segments of data at the new bit rate. DASH's adaptability therefore ensures that the client consumes less than the available bandwidth.

The television show, movie, video conference, or other media content that the client desires to view may be referred to as the main content. The provider of the main content may desire to earn revenue for providing the main content. One way to earn revenue is to include advertisements with the main content. The advertisements may be referred to as ads or ad content. Accordingly, the HTTP server may direct the client to download ads from an ad server. The client may not be able to download or view the main content or portions of the main content until it downloads and views the ad content. Furthermore, certain restrictions may be placed on the browser or other application that the content is viewed through so that the ad content cannot be skipped while viewing. Once the client downloads and views the ads, then the provider of the ad content may pay the provider of the main content.

SUMMARY

In one embodiment, the disclosure includes an apparatus comprising a processor configured to create a Dynamic Adaptive Streaming over Hypertext Transfer Protocol (DASH) media presentation description (MPD), wherein the MPD comprises an AssetIdentifier element associated with a period, wherein the AssetIdentifier element specifies that the period belongs to a certain asset, and wherein the asset is content including media and metadata together with the rights to use the content by a content provider, and a transmitter configured to transmit the MPD.

In another embodiment, the disclosure includes an apparatus comprising a receiver configured to receive a Dynamic Adaptive Streaming over Hypertext Transfer Protocol (DASH) media presentation description (MPD), wherein the MPD comprises an AssetIdentifier element associated with a period, wherein the AssetIdentifier element specifies that the period belongs to a certain asset, and wherein the asset is content including media and metadata together with the rights to use the content by a content provider, and a processor configured to process the MPD.

In yet another embodiment, the disclosure includes a method comprising receiving a Dynamic Adaptive Streaming over Hypertext Transfer Protocol (DASH) media presentation description (MPD), wherein the MPD comprises an AssetIdentifier element associated with a period, wherein the AssetIdentifier element specifies that the period belongs to a certain asset, and wherein the asset is content including media and metadata together with the rights to use the content by a content provider, and processing the MPD.

These and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

Figure 1:
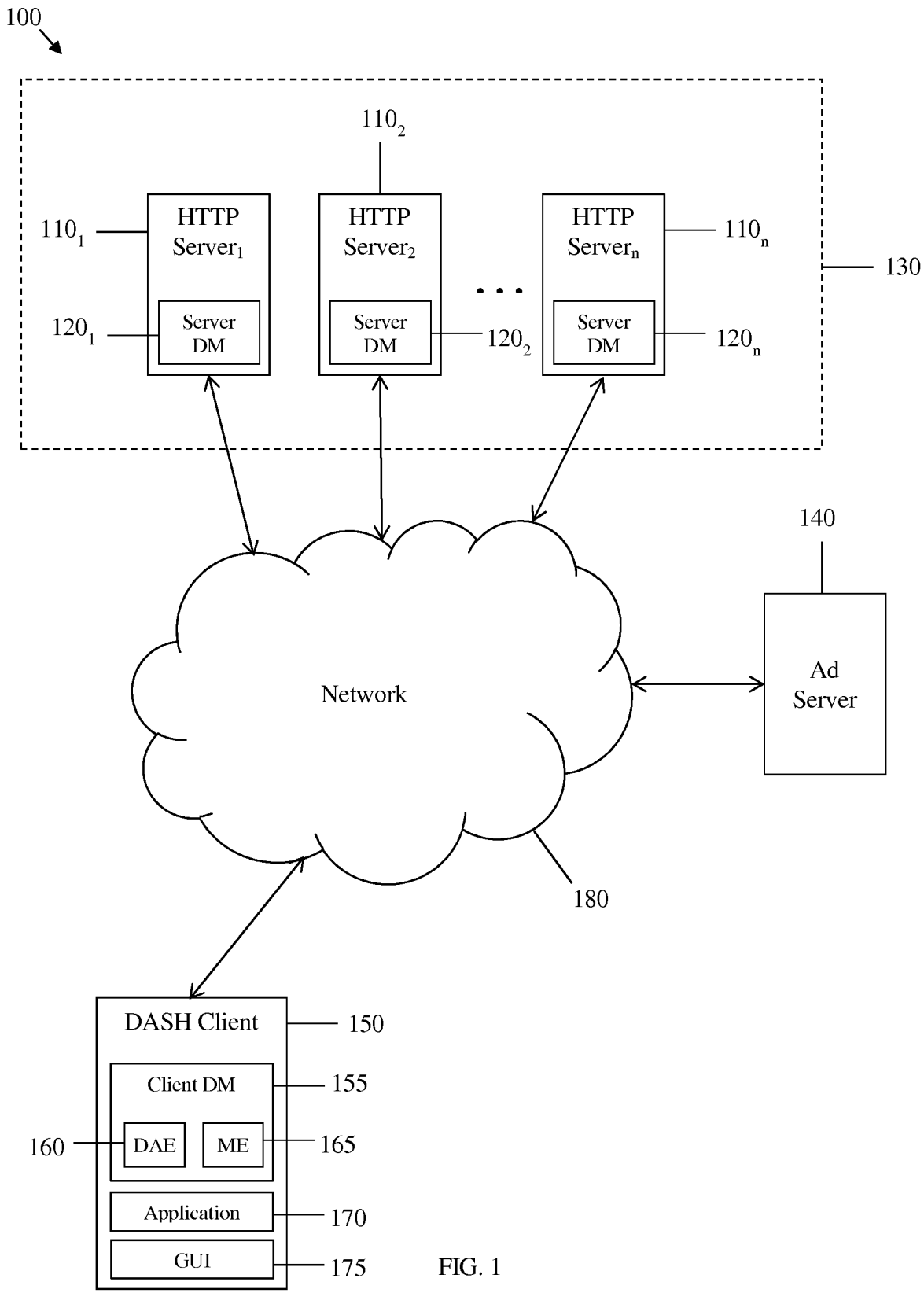
FIG. 1 is a schematic diagram of a DASH system according to an embodiment of the disclosure.

It should be understood at the outset that, although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

HTTP is a stateless protocol, meaning that it treats each request for data as an independent transaction unrelated to any previous request. As a result, an HTTP server cannot directly know which client downloaded which content. Furthermore, the client cannot directly know whether data it is downloading is main content or ad content. Rather, if the client is downloading from multiple HTTP servers, then the client knows only which HTTP server it is downloading from. In addition, DASH currently does not distinguish between main content and ad content.

The lack of a distinction between main content and ad content may cause at least five issues. First, the client may not be able to properly implement a main content progress bar. A progress bar may refer to a graphical indication of a user's temporal progress in viewing content. The progress bar may be viewable to the user in the client's web browser or other application. The issue may be best understood using an example. If a client is downloading a media presentation comprising one minute of ad content followed by five minutes of main content, then the client may implement a progress bar indicating that the fourth minute of the main content is downloading and being viewed when, in reality, only the third minute of the main content is downloading and being viewed because the client may include the first minute of the ad content in calculating the progress of the main content. Second, for the same reason as the first issue, the client may not be able to implement random access functionality, for instance properly seeking to a specific time to view the main content. For example, the user may be in the fourth minute of the main content but desire to return to the third minute of the main content. Without a distinction between the main content and the ad content, a return to the third minute of the main content may be difficult. Third, there may be no way to report that the client downloaded ad content. Without such reporting, the provider of the main content may not receive all of its revenue due from the provider of the ad content. Fourth, without being able to distinguish between main content and ad content, the HTTP server may not be able to associate additional information, such as a movie title, with the main content. Fifth, the HTTP server may not be able to properly implement trick modes. Trick modes may refer to rewind, fast forward, slow motion, pause, and other modes of playing or viewing content other than at normal speed. Trick mode restrictions are often used, especially for ad content. For example, the ad provider may desire for such trick modes to be restricted or completely unavailable in order to ensure that the client downloads, and the user views, the ad content. Workarounds may exist for at least the first two issues, but those workarounds may be complicated and unreliable. A way to distinguish between main content and ad content is therefore desired.

Disclosed herein are systems and methods for improved DASH implementation. The disclosed technique may provide a way for DASH to uniquely identify content. The disclosed technique may therefore address each of the issues above. The disclosed technique may also apply to other standards and be implemented by other standards developing organizations (SDOs). In other words, the disclosed technique is not limited to 23009-1 or even to other DASH standards. Furthermore, the disclosed technique is not limited to video on demand or videoconferencing, but may apply to other forms of media content as well.

FIG. 1 is a schematic diagram of a DASH system 100 according to an embodiment of the disclosure. The system 100 may comprise a plurality of n HTTP servers 110, an ad server 140, a DASH client 150, and a network 180. The HTTP servers 110, ad server 140, and client 150 may be communicatively coupled to each other via the network 180 and other network components such as HTTP caches (not shown).

The HTTP servers 110 may be any hardware computer servers configured to send and receive data via HTTP. The HTTP servers 110 may comprise server DASH modules (DMs) 120 configured to send and receive data via HTTP and according to the DASH standard. The HTTP servers may form a content delivery network (CDN) 130, which may refer to a distributed system of servers deployed in multiple data centers over multiple backbones for the purpose of delivering content. The CDN 130 may comprise any number of HTTP servers 110 so that n may be any number. Typically, a CDN may comprise thousands of servers.

The ad server 140 may be any hardware computer server configured to send and receive data via HTTP. In particular, the ad server 140 may receive requests for ads and send the requested ads to other network components. There may be any number of ad servers 140 across the system 100. If there are multiple ad servers 140, then the ad servers 140 may or may not be associated with each other.

The client 150 may be any hardware device configured to send and receive data via HTTP. For example, the client 150 may be a notebook computer, a tablet computer, a desktop computer, a mobile telephone, or another device. The client 150 may comprise a client DM 155, an application 170, and a graphical user interface (GUI) 175.

The client DM 155 may be configured to send and receive data via HTTP and according to the DASH standard. The client DM 155 may comprise a DASH access engine (DAE) 160 and a media engine (ME) 165. The DAE 160 may be the primary component for receiving raw data from the HTTP servers 110 and constructing that data in a format for viewing. For example, the DAE 160 may format the data in Moving Picture Experts Group (MPEG) container formats along with timing data, then output the formatted data to the ME 165. The ME 165 may be responsible for initialization, playback, and other functions associated with content and may output that content to the application 170.

The application 170 may be a web browser or other application with an interface configured to download and present content. The application 170 may be coupled to the GUI 175 so that a user associated with the client 150 may view the various functions of the application 170. The application 170 may comprise a search function so that the user can search for content. For example, if the application 170 is a media player, then the application 170 may comprise a search bar so that the user may input a string of words to search for a movie. The application 170 may present a list of search hits, and the user may select the desired movie from among the hits. Upon selection, the application 170 may send instructions to the client DM 155 for downloading the movie. The DM 155 may download the movie and process the movie for outputting to the application 170. The application 170 may provide instructions to the GUI 175 for the GUI 175 to display the movie for viewing by the user. The application 170 may further provide instructions to the GUI 175 for the GUI 175 to display a progress bar showing the temporal progress of the movie.

The GUI 175 may be any GUI configured to display functions of the application 170 so that the user may operate the application. As described above, the GUI 175 may display the various functions of the application 170 so that the user may select content to download. The GUI 175 may then display the content for viewing by the user.

The network 180 may be any network configured to provide for communication among the HTTP servers 110, ad server 140, and client 150. For example, the network 180 may be the Internet, a mobile telephone network, or another network. The network 180 may allow communication along wired or wireless channels.

Figure 2:
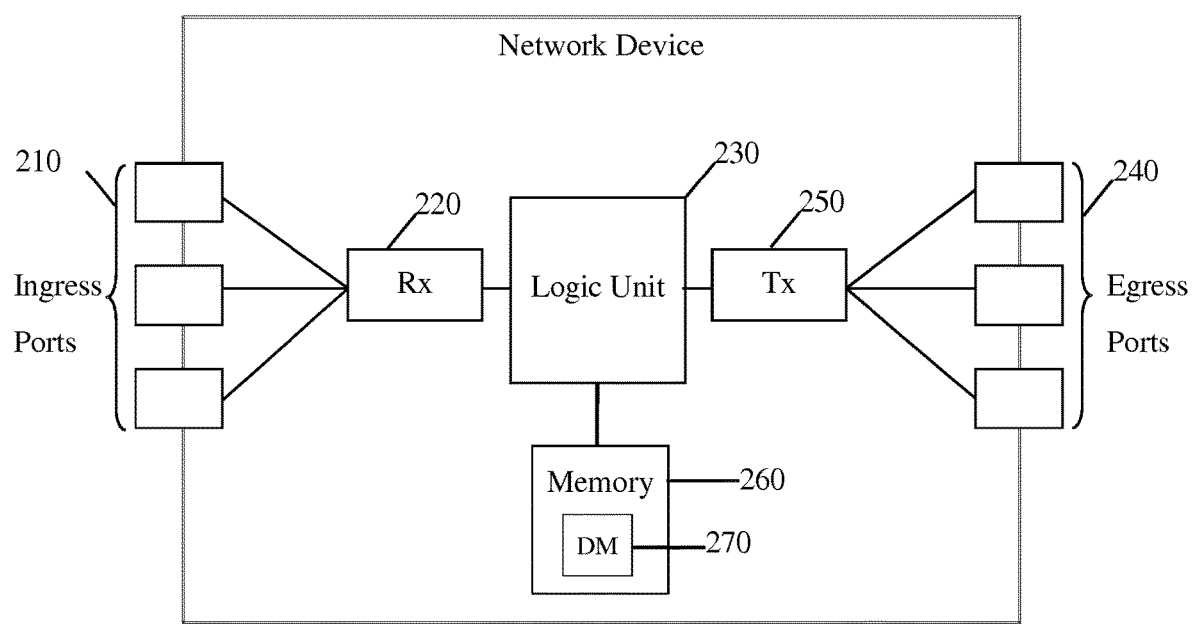
FIG. 2 is a schematic diagram of a network device according to an embodiment of the disclosure.

FIG. 2 is a schematic diagram of a network device 200 according to an embodiment of the disclosure. The device 200 may comprise a plurality of ingress ports 210 and/or receiver units (Rx) 220 for receiving data, a logic unit or processor 230 to process signals, a plurality of egress ports 240 and/or transmitter units (Tx) 250 for transmitting data to other components, and a memory 260. The device 200 may be suitable for implementing any of the disclosed features, methods, and devices. For example, the device 200 may be suitable for implementing the HTTP servers 110, the ad server 140, and the client 150.

The logic unit 230, which may be referred to as a central processing unit (CPU), may be in communication with the ingress ports 210, receiver units 220, egress ports 240, transmitter units 250, and memory 260. The logic unit 230 may be implemented as one or more CPU chips, cores (e.g., as a multi-core processor), field-programmable gate arrays (FPGAs), application specific integrated circuits (ASICs), and/or digital signal processors (DSPs), and/or may be part of one or more ASICs.

The memory 260 may be comprised of one or more disks, tape drives, optical disc drives, or solid-state drives; may be used for non-volatile storage of data and as an over-flow data storage device; may be used to store programs when such programs are selected for execution; and may be used to store instructions and data that are read during program execution. The memory 260 may be volatile and/or non-volatile and may be read-only memory (ROM), random-access memory (RAM), ternary content-addressable memory (TCAM), static random-access memory (SRAM), another suitable type of memory, or any combination thereof. The memory 260 may comprise a DM 270, which may be suitable for implementing the server DMs 120 or the client DM 155. While the memory 260 is shown as comprising the DM 270, the logic unit 230 or any combination of the logic unit 230 and the memory 260 may alternatively comprise the DM 270.

Figure 3:
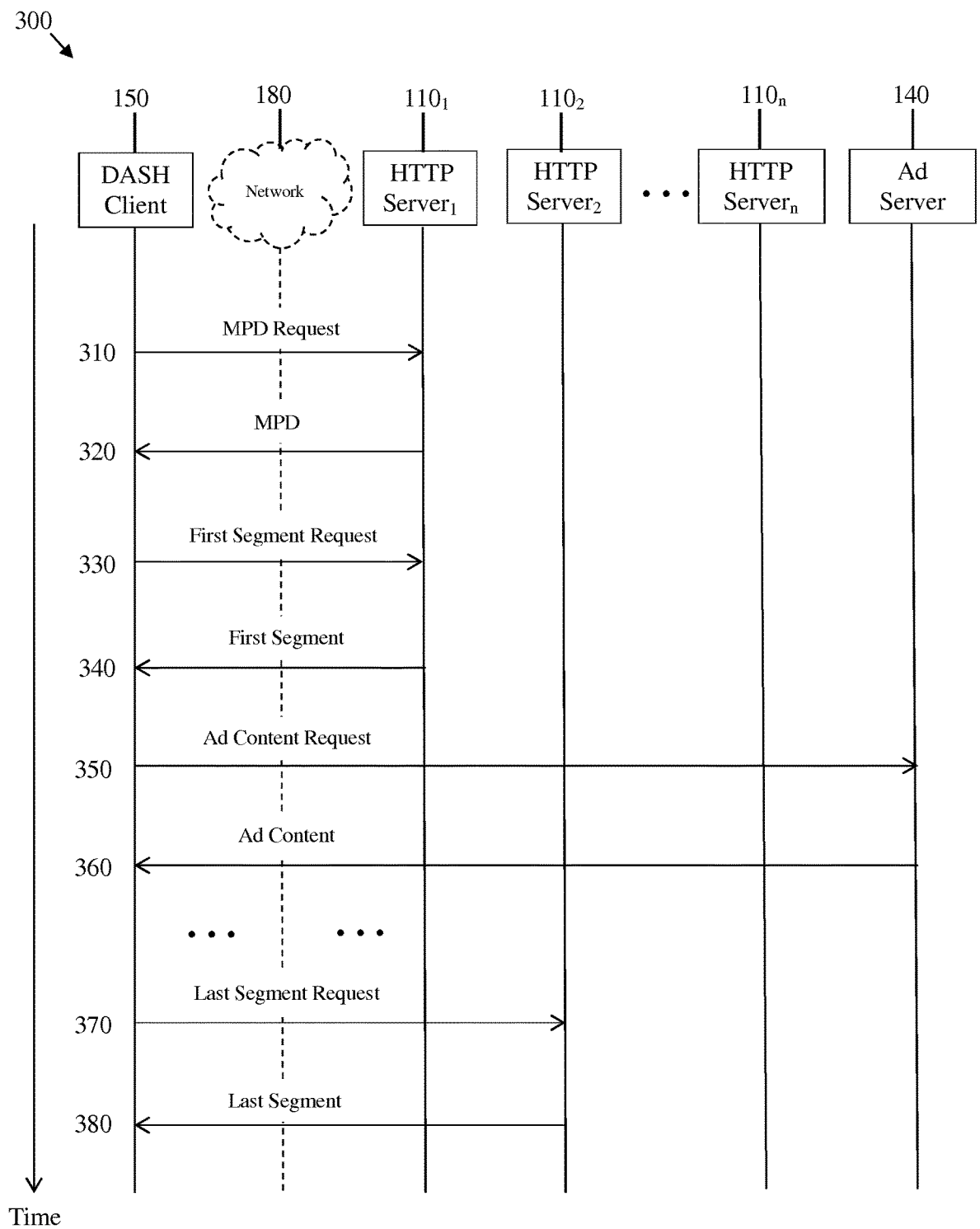
FIG. 3 is a protocol diagram for the DASH system according to an embodiment of the disclosure.

FIG. 3 is a protocol diagram 300 for the DASH system 100 according to an embodiment of the disclosure. The client 150 may desire to download main content. In that case, at step 310, the client 150 may send to the HTTP server$_1$ 110$_1$ a request for an MPD, which may comprise instructions for downloading segments of the main content from any combination of HTTP servers 110. In addition to instructions for downloading segments of the main content, the MPD may require, and comprise instructions for, downloading segments of ad content from the ad server 140. MPDs are described more fully below. At step 320, the HTTP server$_1$ 110$_1$ may send to the client 150 an MPD. The client 150 may receive the MPD via the DAE 160, and the DAE 160 may process the MPD in order to construct and issue requests from the HTTP servers 110 for segments of the main content and ad content.

At step 330, as instructed by the MPD, the client 150 may send to the HTTP server$_1$ 110$_1$ via the DAE 160 a first segment request for a first segment of the main content. At step 340, the HTTP server$_1$ 110$_1$ may send to the client 150 via the server DM 120 the first segment of the main content. The DAE 160 may receive, process, and format the first segment, then output the formatted data to the ME 165, which may perform various functions and output the data to the application 170. After a buffering period, the application 170 may present the data for viewing via the GUI 175.

At step 350, as instructed by the MPD, the client 150 may send to the ad server 140 via the DAE 160 an ad content request. At step 360, the ad server 140 may send to the client 150 the ad content. The MPD may require that the client 150 download and present the ad content before the client 150 proceeds with downloading additional segments of the main content.

Subsequently, as instructed by the MPD, the client 150 may send requests for, and receive, additional segments of the main content as well as ad content until, at step 370, the client 150 may send to the HTTP server$_2$ 110$_2$ via the DAE 160 a last segment request for a last segment of the main content. Finally, at step 380, the HTTP server$_2$ 110$_2$ may send to the client 150 via the server DM 120 the last segment of the main content. After receiving each segment, the DAE 160 may process and format that segment, then output the formatted data to the ME 165. The ME 165 may perform various functions and output the data to the application 170. After a buffering period, the application 170 may present the data for viewing via the GUI 175.

The main content and ad content may be downloaded in any order as instructed by the MPD. The client 150 may download content while simultaneously displaying the content for viewing. The simultaneous downloading and displaying may be why the process is referred to as streaming. The process of requesting and receiving the MPD may be reiterative. For example, the client 150 may request, or be instructed to request, an updated MPD for a variety of reasons.

Figure 4:
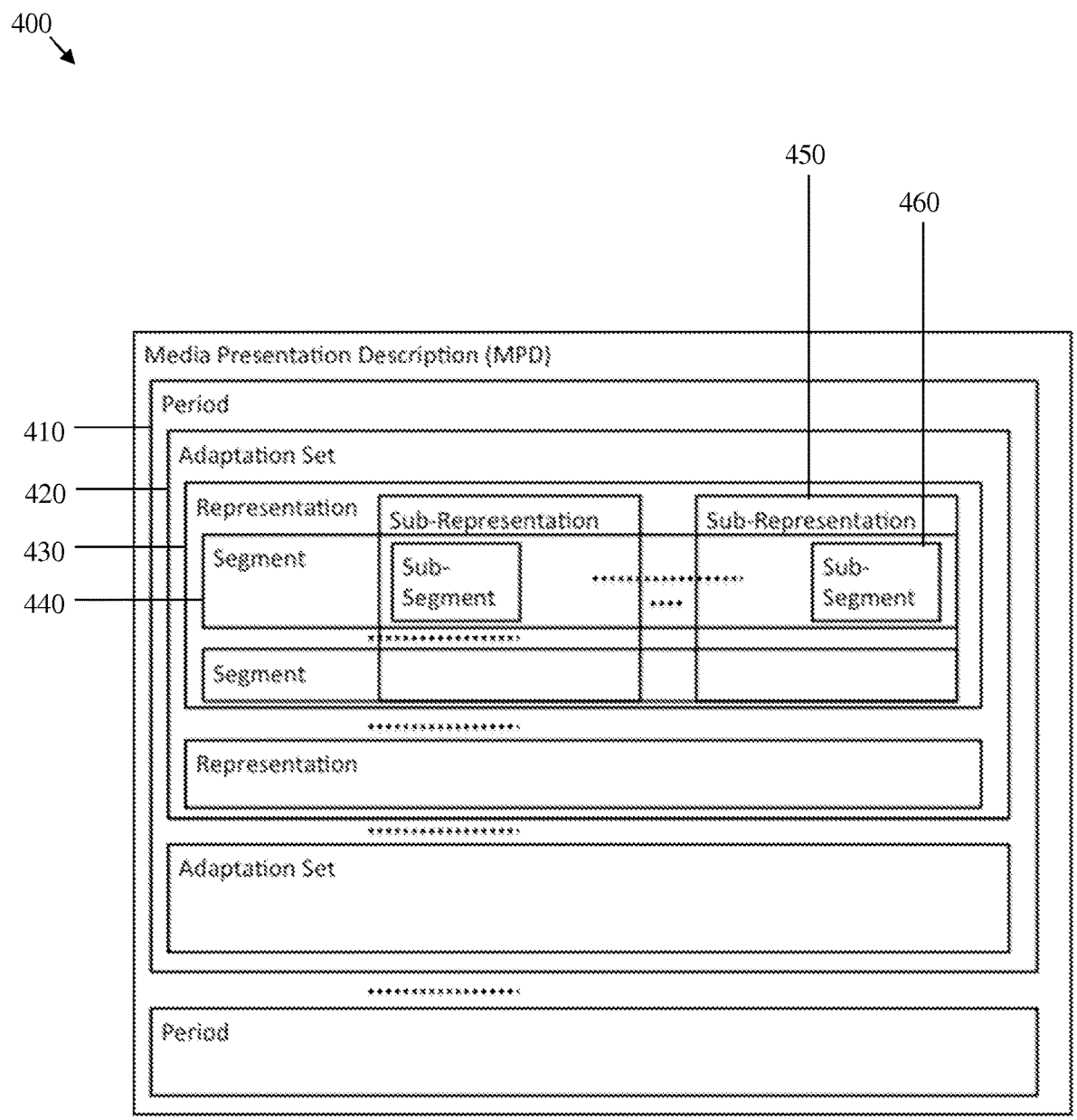
FIG. 4 is a diagram of a media presentation description (MPD) according to an embodiment of the disclosure.

FIG. 4 is a diagram of an MPD 400 according to an embodiment of the disclosure. The MPD 400 may comprise Period 410, Adaptation Set 420, Representation 430, Segment 440, Sub-Representation 450, and Sub-Segment 460 elements. The elements may be distinguished by uppercase first letters or camel-casing, as well as bold face, though bold face is removed herein. For example, the Segment 440 may be an element of the MPD 400 that is associated with a segment, the latter of which may be a unit of data as described more fully below. Similarly, the Period 410 may be associated with a period of data. In 23009-1, the MPD 400 may be referred to as a "formalized description for a [m]edia [p]resentation for the purpose of providing a streaming service." A media presentation, in turn, may be referred to as a "collection of data that establishes a . . . presentation of media content." In particular, the MPD 400 may define formats to announce HTTP uniform resource locators (URLs), or network addresses, for downloading segments of data. A segment may be referred to as a unit of data associated with a URL. In other words, a segment may generally be the largest unit of data that can be retrieved with a single HTTP request using a single URL. The MPD 400 may be an Extensible Markup Language (XML) document.

In short, the MPD 400 may comprise a plurality of URLs, or metadata used by the client 150 to construct a plurality of URLs, pointing to one or more HTTP servers 110 for downloading segments of data. For example, referring to FIG. 3, the client 150 may receive a plurality of URLs in the MPD at step 320. A first URL may be associated with the first segment and point to the HTTP server$_1$ 110$_1$ so that the client 150 requests and receives the first segment from the HTTP server₁ 110₁. A second URL may be associated with the ad content and point to the ad server 140 so that the client 150 requests and receives the ad content from the ad server 140. The process may continue until the client 150 requests and receives content from the HTTP server 110 associated with the last URL.

Referring back to FIG. 4, it can be seen that the MPD 400 is a hierarchical data model. In 23009-1, the Period 410 may typically represent "a media content period during which a consistent set of encoded versions of the media content is available." In other words, the "set of available bitrates, languages, captions, subtitles, etc. does not change during a [p]eriod." The Representation 430 may describe "a deliverable encoded version of one or several media content components." The client 150 "may switch from Representation to Representation . . . in order to adapt to network conditions or other factors." The adaptability of DASH therefore lies among a set of mutually interchangeable Representations 430. The client 150 may determine if it can support a specific Representation 430. If not, then the client 150 may select a different Representation 430 that it can support. The client 150 may then begin downloading each segment within the selected Representation until the client 150 ceases downloading or until the client 150 selects another Representation 430.

The Period 410, Adaptation Set 420, Representation 430, Segment 440, Sub-Representation 450, and Sub-Segment 460 elements describe data. Each element may comprise one or more attributes, which are like properties of the element in that they provide further definition about the element. Elements and attributes are defined in Extensible Markup Language (XML) 1.0, Fifth Edition, 2008, which is incorporated in its entirety. In this text, attributes may be prefixed with the @ symbol. For example, the Period 410 may comprise an @start attribute that may specify when on a presentation timeline a period associated with the Period 410 begins. In addition, the Period 410 may comprise an @duration attribute that may specify the duration of a period associated with the Period 410. The Adaptation Set 420, Segment 440, Sub-Representation 450, and Sub-Segment 460 elements are described in 23009-1 and do not need further explanation herein.

Figure 5:
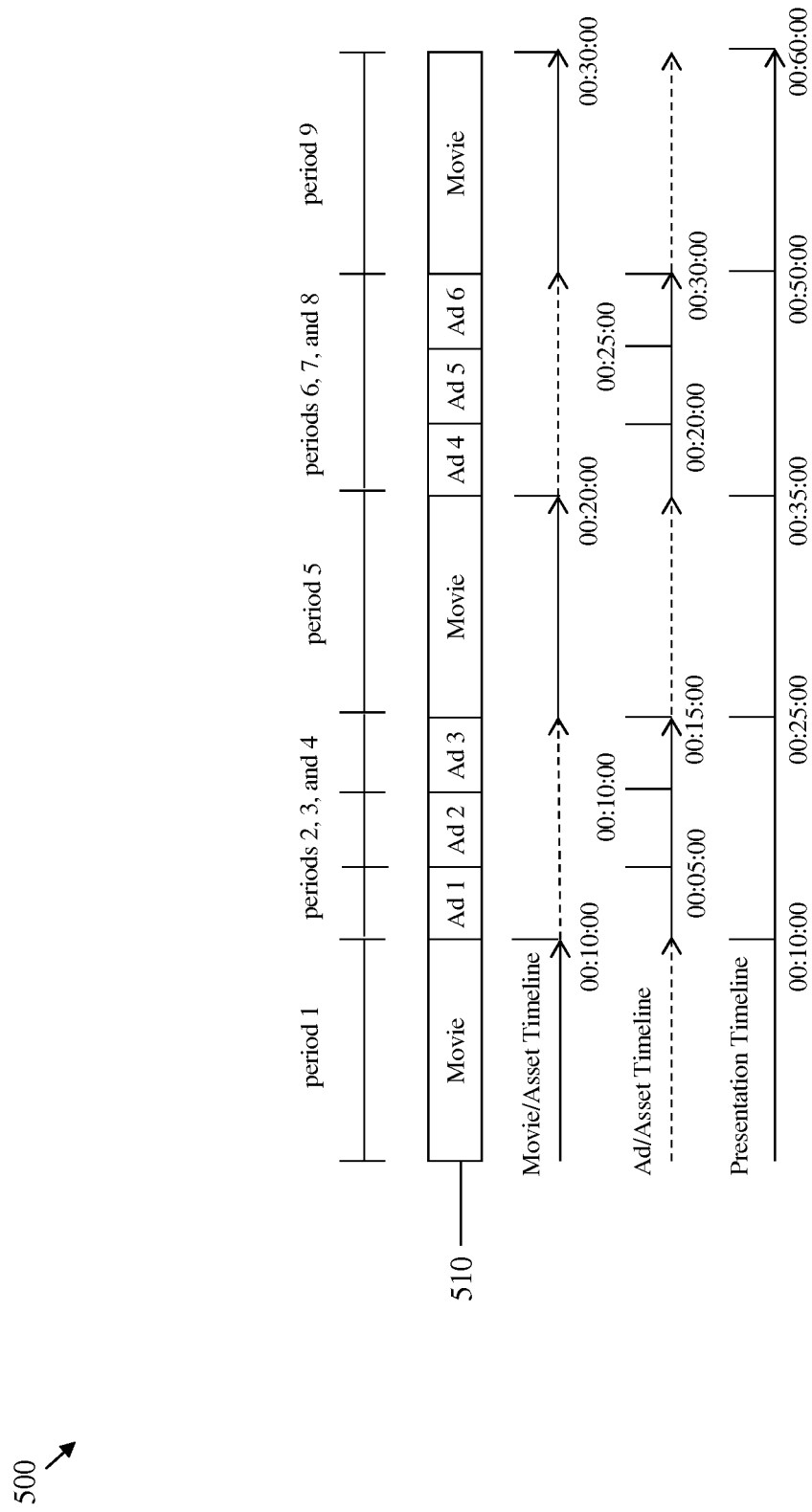
FIG. 5 is a diagram of a media presentation according to an embodiment of the disclosure.

FIG. 5 is a diagram 500 of a media presentation 510 according to an embodiment of the disclosure. The media presentation 510 may comprise nine periods, which may be described in nine Periods 410 in the MPD 400. Periods 1, 5, and 9 may be associated with a movie, or main content. Periods 2-4 and 6-8 may be associated with ads, or ad content. The diagram 500 is one example of a media presentation. In other examples, a media presentation may include pre-roll, mid-roll, and post-roll ad content, meaning that ad content may be included before, in the middle of, and after main content, respectively. Ads may typically be associated with a single period, though a series of ads, for instance ads 1-3, may be associated with a single period.

As described above, the Period 410 may comprise @start and @duration attributes. When the client 150 receives the MPD 400 with @start and @duration attributes for the Period 410, the client 150 may be able to calculate the presentation timeline 510. The presentation timeline, however, contemplates both the main content and the ad content because the MPD 400 does not uniquely identify content. Consequently, when the client 150 downloads and presents the media presentation 510, the movie may be at time 00:20:00 (i.e., the 20th minute of the movie), though a progress bar may show time 00:35:00. In addition, the client 150 may not be able to, for instance, properly seek to time 00:20:00 in the movie.

Accordingly, the concept of an asset may be introduced. An asset may refer to media content, for instance a movie. Alternatively, an asset may refer to content including media and metadata together with the rights to use the content by the content provider. An asset may be uniquely identified by an element. In a first embodiment, the element may be an XML element named, for instance, AssetIdentification or AssetIdentifier. The AssetIdentifier element may be used to identify an asset on the period level and specify that a period belongs to a certain asset. In other words, if two different Periods contain equivalent AssetIdentifiers, then the two associated periods may belong to the same asset. Alternatively, the AssetIdentifier element may be used to identify an asset at other levels as well. If the client 150 does not recognize the AssetIdentifier element, then the client 150 may ignore the AssetIdentifier element. The AssetIdentifier element may be unique for each asset, not for each MPD. The AssetIdentifier element may comprise the attributes shown in Table 1.

TABLE 1

AssetIdentifier element and corresponding attributes

| Element or Attribute Name | Use | Description |
|---|---|---|
| AssetIdentifier | | |
| @assetId | M | Unique identifier for the asset. This value corresponds to unique content (e.g. movie asset, ad spot). Use of standardized and resolvable identifiers is recommended (see examples below). |
| @start | O | If provided, specifies the time on the asset timeline which corresponds to the start time of the period. |
| @type | OD | Defines the type of content. Options may be "main" (main content), "ad-spot" (inserted ad), etc. If absent, "main" is the default value. |

Legend:
For attributes: M = Mandatory; O = Optional; OD = Optional with Default Value; CM = Conditionally Mandatory.
For elements: <minOccurs> . . . <maxOccurs> (N = unbounded).
Elements have uppercase first letters or camel-casing; attributes have a preceding @ symbol.

As shown in Table 1, the AssetIdentifier element may comprise @assetId, @start, and @type attributes. The @assetId attribute may uniquely identify an asset. The @assetId attribute may be, for instance, an International Standard Audiovisual Number (ISAN), an Entertainment Identifier Registry (EIDR), or a Digital Object Identifier (DOI). The @start attribute may specify the time on an asset timeline which corresponds to the start time of the Period. Asset timelines are described more fully below. The @type attribute may define the type of content, for instance main content or ad content, associated with the asset. The XML syntax corresponding to the AssetIdentifier element may be as follows:

```
<!-- Asset Identifier -->
    <xs:complexType name="AssetIdentifier">
        <xs:attribute name="assetId" type="xs:anyUri"
        use="required"/>
        <xs:attribute name="start" type="xs:duration"/>
        <xs:attribute name="type" type="AssetType" default="main"/>
        <xs:anyAttribute namespace="##other" processContents="lax"/>
    </xs:complexType>
```

An example XML document incorporating the AssetIdentifier element may be as follows:

```
<Period id="pre-roll" duration="PT60S">
    <BaseURL>http://cdn1.example.com/</BaseURL>
    <BaseURL>http://cdn2.example.com/</BaseURL>
    <AssetIdentifier
        assetId="urn:org:provider:ad-id:528573CD-1485-13A6-
    56B778222E2B2936" type="ad-spot"/>
        <AdaptationSet
            mimeType="video/mp2t"
            codecs="avc1.4D401F,mp4a"
            frameRate="24000/1001"
            segmentAlignment="true"
            subsegmentAlignment="true"
            bitstreamSwitching="true"
            startWithSAP="2"
            subsegmentStartsWithSAP="2">
            <ContentComponent contentType="video" id="481"/>
            <ContentComponent contentType="audio" id="482" lang="en"/>
            <BaseURL>PreRoll_</BaseURL>
            <SegmentTemplate
                media="$RepresentationID$_$Number%05$.ts"
                initialization="$RepresentationID$-init.ts"
                bitstreamSwitching="$RepresentationID$-bssw.ts"
                duration="4"
                startNumber="1"/>
            <Representation id="720kbps" bandwidth="792000" width="640"
            height="368"/>
            <Representation id="1130kbps" bandwidth="1243000" width="704"
            height="400"/>
            <Representation id="1400kbps" bandwidth="1540000" width="960"
            height="544"/>
            Representation id="2100kbps" bandwidth="2310000" width="1120"
            height="640"/>
            <Representation id="2700kbps" bandwidth="2970000" width="1280"
            height="720"/>
            <Representation id="3400kbps" bandwidth="3740000" width="1280"
            height="720"/>
        </AdaptationSet>
</Period>
<Period id="movie1" duration="PT900S">
    <AssetIdentifier
        assetId="http://dx.doi.org/10.1000/182" type="asset"/>
    <AdaptationSet
        mimeType="video/mp2t"
        codecs="avc1.4D401F,mp4a"
        frameRate="24000/1001"
        segmentAlignment="true"
        subsegmentAlignment="true"
        bitstreamSwitching="true"
        startWithSAP="2"
        subsegmentStartsWithSAP="2">
        <ContentComponent contentType="video" id="481"/>
        <ContentComponent contentType="audio" id="482" lang="en"/>
        <ContentComponent contentType="audio" id="483" lang="es"/>
        <BaseURL>SomeMovie_</BaseURL>
        <SegmentTemplate
            media="$RepresentationID$_$Number%05$.ts"
            index="$RepresentationID$.sidx"
            initialization="$RepresentationID$-init.ts"
            bitstreamSwitching="$RepresentationID$-bssw.ts"
            duration="4"
            startNumber="1"/>
        <Representation id="720kbps" bandwidth="792000" width="640"
        height="368" >
            <SubRepresentation level="1" contentComponent="481"
            maxPlayoutRate="32"/>
            <SubRepresentation level="2" contentComponent="481"
            maxPlayoutRate="4" dependencyLevel="1"/>
            <SegmentBase timescale="90000"
            presentationTimeOffset="162000000" />
        </Representation>
        <Representation id="1130kbps" bandwidth="1243000" width="704"
        height="400">
            <SubRepresentation level="1" contentComponent="481"
            maxPlayoutRate="32"/>
            <SubRepresentation level="2" contentComponent="481"
            maxPlayoutRate="4" dependencyLevel="1"/>
        </Representation>
        <Representation id="1400kbps" bandwidth="1540000" width="960"
        height="544">
            <SubRepresentation level="1" contentComponent="481"
            maxPlayoutRate="32"/>
```

```xml
            <SubRepresentation level="2" contentComponent="481"
                maxPlayoutRate="4" dependencyLevel="1"/>
        </Representation>
        <Representation id="2100kbps" bandwidth="2310000" width="1120"
            height="640">
            <SubRepresentation level="1" contentComponent="481"
                maxPlayoutRate="32"/>
            <SubRepresentation level="2" contentComponent="481"
                maxPlayoutRate="4" dependencyLevel="1"/>
        </Representation>
        <Representation id="2700kbps" bandwidth="2970000" width="1280"
            height="720">
            <SubRepresentation level="1" contentComponent="481"
                maxPlayoutRate="32"/>
            <SubRepresentation level="2" contentComponent="481"
                maxPlayoutRate="4" dependencyLevel="1"/>
        </Representation>
        <Representation id="3400kbps" bandwidth="3740000" width="1280"
            height="720">
            <SubRepresentation level="1" contentComponent="481"
                maxPlayoutRate="32"/>
            <SubRepresentation level="2" contentComponent="481"
                maxPlayoutRate="4" dependencyLevel="1"/>
        </Representation>
    </AdaptationSet>
</Period>
<Period id="mid-roll #1" duration="PT240S">
    <AdaptationSet
        mimeType="video/mp2t"
        codecs="avc1.4D401F,mp4a"
        frameRate="24000/1001"
        segmentAlignment="true"
        subsegmentAlignment="true"
        bitstreamSwitching="true"
        startWithSAP="2"
        subsegmentStartsWithSAP="2">
        <AssetIdentifier
            assetId="urn:org:provider:ad-id:89ac2cf2-0a0e-4e27-8493-
            e8e7106a6646" type="ad-spot"/>
            <ContentComponent contentType="video" id="481"/>
            <ContentComponent contentType="audio" id="482" lang="en"/>
            <BaseURL>MidRoll_</BaseURL>
            <SegmentTemplate
    media="$RepresentationID$_$Number%05$.ts?cid=480ccc41e6b7&sid=99b2&d=3"
            initialization="$RepresentationID$-init.ts"
            bitstreamSwitching="$RepresentationID$-bssw.ts"
            duration="4"
            startNumber="1"/>
        <Representation id="720kbps" bandwidth="792000" width="640"
            height="368"/>
        <Representation id="1130kbps" bandwidth="1243000" width="704"
            height="400"/>
        <Representation id="1400kbps" bandwidth="1540000" width="960"
            height="544"/>
        <Representation id="2100kbps" bandwidth="2310000" width="1120"
            height="640"/>
        <Representation id="2700kbps" bandwidth="2970000" width="1280"
            height="720"/>
        <Representation id="3400kbps" bandwidth="3740000" width="1280"
            height="720"/>
    </AdaptationSet>
</Period>
<Period id="movie2" duration="PT900S">
    <AssetIdentifier assetId="http://dx.doi.org/10.1000/182" start="PT900S"
        type="asset"/>
    <AdaptationSet
        mimeType="video/mp2t"
        codecs="avc1.4D401F,mp4a"
        frameRate="24000/1001"
        segmentAlignment="true"
        subsegmentAlignment="true"
        bitstreamSwitching="true"
        startWithSAP="2"
        subsegmentStartsWithSAP="2">
        <ContentComponent contentType="video" id="481"/>
        <ContentComponent contentType="audio" id="482" lang="en"/>
```

-continued

```
        <ContentComponent contentType="audio" id="483" lang="es"/>
        <BaseURL>SomeMovie_</BaseURL>
        <SegmentTemplate
    media="$RepresentationID$__$Number%05$.ts?cid=480ccc41e6b7&si
    d=99b2&d=3"
            index="$RepresentationID$.sidx"
            initialization="$RepresentationID$-init.ts"
            bitstreamSwitching="$RepresentationID$-bssw.ts"
            duration="4"
            startNumber="1"/>
        <Representation id="720kbps" bandwidth="792000" width="640"
        height="368" >
            <SubRepresentation level="1" contentComponent="481"
            maxPlayoutRate="32"/>
            <SubRepresentation level="2" contentComponent="481"
            maxPlayoutRate="4" dependencyLevel="1"/>
            <SegmentBase timescale="90000"
            presentationTimeOffset="162000000" />
        </Representation>
        <Representation id="1130kbps" bandwidth="1243000" width="704"
        height="400">
            <SubRepresentation level="1" contentComponent="481"
            maxPlayoutRate="32"/>
            <SubRepresentation level="2" contentComponent="481"
            maxPlayoutRate="4" dependencyLevel="1"/>
        </Representation>
        <Representation id="1400kbps" bandwidth="1540000" width="960"
        height="544">
            <SubRepresentation level="1" contentComponent="481"
            maxPlayoutRate="32"/>
            <SubRepresentation level="2" contentComponent="481"
            maxPlayoutRate="4" dependencyLevel="1"/>
        </Representation>
        <Representation id="2100kbps" bandwidth="2310000" width="1120"
        height="640">
            <SubRepresentation level="1" contentComponent="481"
            maxPlayoutRate="32"/>
            <SubRepresentation level="2" contentComponent="481"
            maxPlayoutRate="4" dependencyLevel="1"/>
        </Representation>
        Representation id="2700kbps" bandwidth="2970000" width="1280"
        height="720">
            <SubRepresentation level="1" contentComponent="481"
            maxPlayoutRate="32"/>
            <SubRepresentation level="2" contentComponent="481"
            maxPlayoutRate="4" dependencyLevel="1"/>
        </Representation>
        <Representation id="3400kbps" bandwidth="3740000" width="1280"
        height="720">
            <SubRepresentation level="1" contentComponent="481"
            maxPlayoutRate="32"/>
            <SubRepresentation level="2" contentComponent="481"
            maxPlayoutRate="4" dependencyLevel="1"/>
        </Representation>
    </AdaptationSet>
</Period>.
```

With the addition of the AssetIdentifier element, the client 150 may properly calculate an asset timeline. For example, if an asset is the movie in periods 1, 5, and 9 in FIG. 5, then an asset timeline may correspond to the movie timeline in FIG. 5. An asset timeline may therefore be equivalent to a presentation timeline of the movie. The asset timeline may be identical to the presentation timeline in a single period. While the presentation timeline may span across all periods, the asset timeline may correlate to all periods related to the movie. The AssetIdentifier may therefore allow the client 150 to translate between the presentation timeline and the asset timeline.

The client 150 may calculate the asset timeline in at least three ways. First, the MPD 400 may comprise an AssetIdentifier element for Period 1 that uniquely identifies period 1 as comprising the movie. An @duration attribute for Period 1 may identify that period 1 lasts for 10 minutes. The client 150 may therefore determine that the asset timeline for the movie should include 10 minutes for period 1. The AssetIdentifier elements for Periods 2-4 may identify that periods 2-4 comprise assets different from the movie and the @duration attributes for Periods 2-4 may identify that periods 2-4 last for 15 minutes, so the client 150 may determine that the asset timeline for the movie should not include the 15 minutes for periods 2-4. The AssetIdentifier element for Period 5 may identify that period 5 comprises the movie and the @duration attribute for Period 5 may identify that period 5 lasts for 10 minutes, so the client 150 may determine that the asset timeline for the movie should include the 10 minutes for Period 5. The AssetIdentifier elements for Periods 6-8 may identify that periods 6-8 comprise assets different from the movie and the @duration attributes for Periods 6-8 may identify that periods 6-8 last for 15 minutes, so the client 150 may determine that the asset timeline for the movie should not include the 15 minutes for periods 6-8. The AssetIdentifier element for Period 9 may identify that period 9 comprises the movie and the @duration attribute for Period 9 may identify that period 9 lasts for 10 minutes, so the client 150 may determine that the asset timeline for the movie should include the 10 minutes for period 9. By adding the 10-minute periods for the movie, the client 150 may determine that the movie lasts for 30 minutes, so the client 150 may be able to determine an asset timeline for the movie.

Second, the MPD 400 may comprise an AssetIdentifier element for Period 1 that uniquely identifies period 1 as comprising the movie, and an @start attribute for Period 1 may identify that period 1 begins at 0 minutes on the presentation timeline. The AssetIdentifier element for Periods 2-4 may identify that periods 2-4 comprise assets different from the movie, and an @start attribute for Period 2 may identify that period 2 begins at 10 minutes on the presentation timeline, so the client 150 may determine that the asset timeline for the movie should include only 10 minutes for period 1. The AssetIdentifier element for Period 5 may identify that period 5 comprises the movie and the @start attribute for Period 5 may identify that period 5 begins at 25 minutes on the presentation timeline. The AssetIdentifier element for Periods 6-8 may identify that period 6-8 comprise assets different from the movie, and an @start attribute for Period 6 may identify that period 6 begins at 35 minutes on the presentation timeline, so the client 150 may determine that the asset timeline for the movie should include only 10 minutes for period 5. The AssetIdentifier element for Period 9 may identify that period 9 comprises the movie and the @start attribute for Period 9 may identify that period 9 begins at 50 minutes on the presentation timeline. There are no further Periods, so the client 150 may determine that the asset timeline for the movie should include the 10 minutes for Period 9. By adding the 10-minute periods for the movie, the client 150 may determine that the movie lasts for 30 minutes, so the client 150 may be able to determine an asset timeline for the movie.

Third, the MPD 400 may comprise AssetIdentifier elements for Periods 1, 5, and 9 that uniquely identify periods 1, 5, and 9 as comprising the movie. Furthermore, the AssetIdentifier elements for Periods 1, 5, and 9 may comprise @start attributes that directly specify times on an asset timeline, as opposed to on a presentation timeline, which corresponds to the start times of periods 1, 5, and 9. The client 150 may therefore directly determine an asset timeline for the movie.

In a second embodiment, the element may be an AssetIdentifier element of the type DescriptorType. Like the first embodiment above, the AssetIdentifier element in the second embodiment may be used to identify an asset on the period level and specify that a period belongs to a certain asset. Alternatively, the AssetIdentifier element may be used to identify an asset at other levels as well. If the client 150 does not recognize the AssetIdentifier element, then the client 150 may ignore the AssetIdentifier element. The AssetIdentifier element may be unique for each asset, not for each MPD. The AssetIdentifier element may comprise an @schemeIdUri attribute and an @value attribute. The @schemeIdUri attribute may specify a uniform resource identifier (URI) to identify a scheme. The @value attribute may be used to indicate whether the asset comprises main content or inserted content. Inserted content may refer to ad content or any other content that is not main content. An example of the XML syntax corresponding to the AssetIdentifier element may be as follows:

```
<AssetIdentifier schemeIdUri="urn:org:somelabs:asset-id"
value="main">10.5240/
1489-49A2-3956-4B2D-FE16-5</ AssetIdentifier >.
```

In the example above, the @schemeIdUri attribute may specify a URI to identify a scheme that indicates that the @value attribute and the element content are to be interpreted as described in the second embodiment, the @value attribute may indicate that the asset is main content, and the element content may indicate an EIDR of an associated asset. Because the AssetIdentifier element does not comprise an @start attribute, the client 150 may not use the second or third method for calculating an asset timeline described above. Rather, the client 150 may use the first method for calculating an asset timeline described above.

By determining an asset timeline for the movie, the client 150 may be able to properly implement a progress bar for the movie and random access functionality on the asset timeline. Furthermore, by identifying ads by the @type attribute of the AssetIdentifier element, the client 150 may be able to determine when it downloads ads and may therefore report to the HTTP server 110 or the ad server 140 when it does so. Alternatively, by identifying ads by the @type attribute of the AssetIdentifier element, the HTTP server 110 may be able to determine when it uploads the MPD 400 associated with ads and may therefore report to the ad server 140 when it does so. Finally, by uniquely identifying assets by the @assetId attribute of the AssetIdentifier element, the client 150 may access additional information about those assets, for instance a title, a summary, an actor, an actress, a rating, trivia, a review, social media data, and information about a product or service being advertised.

In addition to the AssetIdentifier element, an element for implementing trick mode restrictions, for instance a TrickModeRestriction element, may be introduced. The TrickModeRestriction element may comprise the attributes shown in Table 2.

TABLE 2

TrickModeRestriction element and corresponding attributes

| Element or Attribute Name | Use | Description |
| --- | --- | --- |
| TrickModeRestriction | | |
| @minSpeed | OD | Minimum allowed trick play speed. Default value is −INF. |
| @maxSpeed | OD | Maximum allowed trick play speed. Default value is INF. |

Legend:
For attributes: M = Mandatory; O = Optional; OD = Optional with Default Value; CM = Conditionally Mandatory.
For elements: <minOccurs> . . . <maxOccurs> (N = unbounded).
Elements have uppercase first letters or camel-casing; attributes have a preceding @ symbol.

As shown in Table 2, the TrickModeRestriction element may comprise @minSpeed and @maxSpeed attributes. The @minSpeed attribute may define the minimum allowed trick play speed. The @maxSpeed attribute may define the maximum allowed trick play speed. Speed may be referred to as the factor which the presentation rate is multiplied by for trick mode purposes. Speed may be identical to the Speed header defined in section 12.35 of Internet Engineering Task Force (IETF) Request for Comments (RFC) 2326, Real Time Streaming Protocol (RTSP), 1998, which is incorporated in its entirety. Speeds less than zero may represent rewind speeds, a speed of zero may represent a pause, speeds between zero and one may represent slow-motions speeds, a speed of one may represent normal speed, and speeds greater than one may represent fast forward speeds. These trick mode restrictions may be behavioral restrictions that regulate client 150 behavior and may be unrelated to whether there are, for instance, SubRepresentations that support such trick modes. The trick mode restrictions may be implemented in multiple ways. For example, they may be implemented via a dedicated client 150-specific descriptor and an element at the Period level. Alternatively, they may be implemented via elements of the SCTE 130-10 schema defined in Society of Cable Telecommunications Engineers (SCTE) Digital Program Insertion—Advertising Systems Interfaces, Part 10, Stream Restriction Data Model (SRDM), 2013, which is incorporated in its entirety. Such alternative implementation may comprise using an element of the type DescriptorType which contains an @schemeIdUri attribute indicating that SRDM elements are contained within it and contains XML elements and attributes defined in SRDM.

The MPD 400 may associate a TrickModeRestriction element with a specific Period. For example, because Periods 2-4 and 6-8 are associated with ads, the MPD 400 may provide a TrickModeRestriction element for Periods 2-4 and 6-8. Accordingly, trick modes may be limited or completely unavailable for Periods 2-4 and 6-8 to ensure that the client 150 downloads, and the user views, the ad content associated with those Periods. An ad provider may determine the TrickModeRestriction element, the @minSpeed attribute, and the @maxSpeed attribute.

Figure 6:
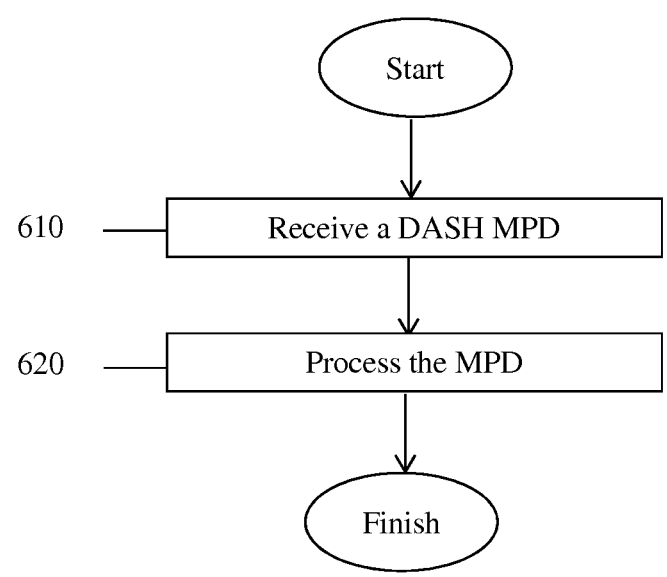
FIG. 6 is a flowchart illustrating a method according to an embodiment of the disclosure.

FIG. 6 is a flowchart illustrating a method 600 according to an embodiment of the disclosure. The method 600 may be implemented, for instance, in the client 150. At step 610, a DASH MPD may be received. The DASH MPD may be the MPD 400. The MPD may comprise an AssetIdentifier element associated with a period. The AssetIdentifier element may specify that the period belongs to a certain asset. The asset may be content including media and metadata together with the rights to use the content by a content provider. At step 620, the MPD may be processed. The client 150 may process the MPD 400 and, for instance, implement a progress bar and random access functionality on an asset timeline.

At least one embodiment is disclosed and variations, combinations, and/or modifications of the embodiment(s) and/or features of the embodiment(s) made by a person having ordinary skill in the art are within the scope of the disclosure. Alternative embodiments that result from combining, integrating, and/or omitting features of the embodiment(s) are also within the scope of the disclosure. Where numerical ranges or limitations are expressly stated, such express ranges or limitations may be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). For example, whenever a numerical range with a lower limit, $R_l$, and an upper limit, $R_u$, is disclosed, any number falling within the range is specifically disclosed. In particular, the following numbers within the range are specifically disclosed: $R=R_l+k*(R_u-R_l)$, wherein k is a variable ranging from 1 percent to 100 percent with a 1 percent increment, i.e., k is 1 percent, 2 percent, 3 percent, 4 percent, 5 percent, . . . , 50 percent, 51 percent, 52 percent, . . . , 95 percent, 96 percent, 97 percent, 98 percent, 99 percent, or 100 percent. Moreover, any numerical range defined by two R numbers as defined in the above is also specifically disclosed. The use of the term "about" means +/−10% of the subsequent number, unless otherwise stated. Use of the term "optionally" with respect to any element of a claim means that the element is required, or alternatively, the element is not required, both alternatives being within the scope of the claim. Use of broader terms such as comprises, includes, and having may be understood to provide support for narrower terms such as consisting of, consisting essentially of, and comprised substantially of. Accordingly, the scope of protection is not limited by the description set out above but is defined by the claims that follow, that scope including all equivalents of the subject matter of the claims. Each and every claim is incorporated as further disclosure into the specification and the claims are embodiment(s) of the present disclosure. The discussion of a reference in the disclosure is not an admission that it is prior art, especially any reference that has a publication date after the priority date of this application. The disclosure of all patents, patent applications, and publications cited in the disclosure are hereby incorporated by reference, to the extent that they provide exemplary, procedural, or other details supplementary to the disclosure.

While several embodiments have been provided in the present disclosure, it may be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and may be made without departing from the spirit and scope disclosed herein.

What is claimed is:

1. An apparatus comprising:
    a processor configured to create a Dynamic Adaptive Streaming over Hypertext Transfer Protocol (DASH) media presentation description (MPD), wherein the MPD comprises periods and an AssetIdentifier element, wherein the periods are associated with content, each period comprises adaptation sets, each adaptation set comprises representations, and each representation comprises segments, wherein the AssetIdentifier element identifies an asset on a period level, wherein two different periods containing equivalent AssetIdentifier elements have content belonging to a same asset, wherein the AssetIdentifier element comprises an attribute, wherein the attribute defines a type of the content and identifies whether the content is ad content or main content, and wherein the asset is content including media and metadata together with rights to use the content by a content provider; and
    a transmitter coupled to the processor and configured to transmit the MPD.

2. The apparatus of claim 1, wherein the AssetIdentifier element comprises an @assetId attribute and an @start attribute, wherein the @assetId attribute is a unique identifier for the asset, and wherein the @start attribute specifies a time on an asset timeline which corresponds to a start time of a first period associated with the asset.

3. The apparatus of claim 2, wherein the MPD is a formalized description for a media presentation for a purpose of providing a streaming service.

4. The apparatus of claim 3, wherein the periods are intervals of the media presentation where a contiguous sequence of all the periods constitutes the media presentation.

5. The apparatus of claim 2, wherein two AssetIdentifiers are equivalent when they have a same @assetId attribute.

6. The apparatus of claim 1, wherein the MPD further comprises a TrickModeRestriction element, wherein the TrickModeRestriction element comprises an @minSpeed attribute and an @maxSpeed attribute, wherein the @minSpeed attribute specifies a minimum allowed trick play speed, and wherein the @maxSpeed attribute specifies a maximum allowed trick play speed.

7. The apparatus of claim 6, wherein at least one of the TrickModeRestriction element, the @minSpeed attribute, and the @maxSpeed attribute is determined by the content provider.

8. The apparatus of claim 1, wherein the processor is further configured to generate a report indicating transmission of the MPD when the attribute identifies that the content is ad content, and wherein the transmitter is further configured to transmit the report to an ad server.

9. An apparatus comprising:
a receiver configured to receive a Dynamic Adaptive Streaming over Hypertext Transfer Protocol (DASH) media presentation description (MPD), wherein the MPD comprises periods and an AssetIdentifier element, wherein the periods are associated with content, each period comprises adaptation sets, each adaptation set comprises representations, and each representation comprises segments, wherein the AssetIdentifier element identifies an asset on a period level, wherein two different periods containing equivalent AssetIdentifier elements have content belonging to a same asset, wherein the AssetIdentifier element comprises an attribute, wherein the attribute defines a type of the content and identifies whether the content is ad content or main content, and wherein the asset is content including media and metadata together with rights to use the content by a content provider; and
a processor coupled to the receiver and configured to process the MPD.

10. The apparatus of claim 9, wherein the AssetIdentifier element is an Extensible Markup Language (XML) element and comprises an @assetId attribute and an @start attribute, wherein the @assetId attribute is a unique identifier for the asset, and wherein the @start attribute specifies a time on an asset timeline which corresponds to a start time of a first period associated with the asset.

11. The apparatus of claim 9, wherein the AssetIdentifier element further comprises an @duration attribute that specifies a duration of a first period.

12. The apparatus of claim 11, wherein the processor is further configured to determine an asset timeline based on the AssetIdentifier element.

13. The apparatus of claim 12, wherein the processor is further configured to implement a progress bar of the asset based on the asset timeline.

14. The apparatus of claim 9, wherein the processor is further configured to generate a report indicating downloading of the MPD when the attribute identifies that the content is ad content, and wherein the apparatus further comprises a transmitter coupled to the processor and configured to transmit the report to an ad server.

15. A method comprising:
receiving a Dynamic Adaptive Streaming over Hypertext Transfer Protocol (DASH) media presentation description (MPD), wherein the MPD comprises periods and an AssetIdentifier element, wherein the periods are associated with content, each period comprises adaptation sets, each adaptation set comprises representations, and each representation comprises segments, wherein the AssetIdentifier element identifies an asset on a period level, wherein two different periods containing equivalent AssetIdentifier elements have content belonging to a same asset, wherein the AssetIdentifier element comprises an attribute, wherein the attribute defines a type of the content and identifies whether the content is ad content or main content, and wherein the asset is content including media and metadata together with rights to use the content by a content provider; and
processing the MPD.

16. The method of claim 15, wherein the AssetIdentifier element comprises an @assetId attribute and an @start attribute, wherein the @assetId attribute is a unique identifier for the asset, and wherein the @start attribute specifies a time on an asset timeline which corresponds to a start time of a first period associated with the asset.

17. The method of claim 15, further comprising:
determining a uniform resource locator (URL) associated with the asset;
requesting a first segment of the asset associated with the URL;
receiving the first segment; and
reporting receipt of the first segment.

18. The method of claim 15, further comprising determining an asset timeline based on the AssetIdentifier element.

19. The method of claim 18, further comprising:
implementing a progress bar of the asset based on the asset timeline; and
implementing random access functionality on the asset timeline.

20. The method of claim 18, wherein the asset timeline distinguishes between main content and ad content.

21. The method of claim 15, further comprising receiving additional information about the asset, wherein the additional information is at least one of a title, a summary, an actor, an actress, a rating, trivia, a review, social media data, and information about a product or service being advertised.

22. The method of claim 15, further comprising:
generating a report indicating downloading of the MPD when the AssetIdentifier element specifies that a first period belongs to an ad; and
transmitting the report to an ad server.

23. A Dynamic Adaptive Streaming over Hypertext Transfer Protocol (DASH) server comprising:
a processor configured to generate a DASH media presentation description (MPD) comprising periods and an AssetIdentifier element, wherein the periods are associated with content, each period comprises adaptation sets, each adaptation set comprises representations, and each representation comprises segments, wherein the AssetIdentifier element identifies an asset on a period level, wherein two different periods containing equivalent AssetIdentifier elements have content belonging to a same asset, and wherein the AssetIdentifier element comprises:
- a first attribute that provides a uniform resource identifier (URI) to identify a scheme; and
- a second attribute that specifies a value for the AssetIdentifier element, wherein the first attribute, the second attribute, or both defines a type of content and identifies whether the content is ad content or main content; and a transmitter coupled to the processor and configured to transmit the MPD to a DASH client.

24. The DASH server of claim 23, wherein the first attribute is an @schemeIdUri attribute and the second attribute is an @value attribute.

25. A Dynamic Adaptive Streaming over Hypertext Transfer Protocol (DASH) client comprising:
- a receiver configured to receive from a DASH client a DASH media presentation description (MPD) comprising periods and an AssetIdentifier element, wherein the periods are associated with content, each period comprises adaptation sets, each adaptation set comprises representations, and each representation comprises segments, wherein the AssetIdentifier element identifies an asset on a period level, wherein two different periods containing equivalent AssetIdentifier elements have content belonging to a same asset, and wherein the AssetIdentifier element comprises:
  - a first attribute that provides a uniform resource identifier (URI) to identify a scheme; and
  - a second attribute that specifies a value for the AssetIdentifier element, wherein the first attribute, the second attribute, or both defines a type of content and identifies whether the content is ad content or main content; and
- a processor coupled to the receiver and configured to parse the first attribute and the second attribute from the MPD.

26. The DASH client of claim 25, wherein the first attribute is an @schemeIdUri attribute and the second attribute is an @value attribute.

* * * * *